United States Patent
Fulks et al.

(10) Patent No.: US 6,574,959 B2
(45) Date of Patent: Jun. 10, 2003

(54) ELECTRIC BRAKE BOOSTER WITH UNRESTRICTED MANUAL PUSH THROUGH

(75) Inventors: Gary C. Fulks, Dayton, OH (US); David B. Drennen, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/921,388

(22) Filed: Aug. 2, 2001

(65) Prior Publication Data

US 2003/0024245 A1 Feb. 6, 2003

(51) Int. Cl.[7] .................................................. F15B 7/00
(52) U.S. Cl. ............................................................ 60/545
(58) Field of Search .................... 60/545, 534; 303/70; 91/369.1, 369.2, 369.3

(56) References Cited

U.S. PATENT DOCUMENTS

| | | | | |
|---|---|---|---|---|
| 4,395,883 A | * | 8/1983 | Melinat | 60/545 |
| 4,918,921 A | | 4/1990 | Leigh-Monstevens et al. | |
| 5,094,079 A | * | 3/1992 | Leigh-Monstevens et al. | 60/545 |
| 6,230,492 B1 | * | 5/2001 | Kingston et al. | 60/545 |

* cited by examiner

*Primary Examiner*—Edward K. Look
*Assistant Examiner*—Thomas E. Lazo
(74) *Attorney, Agent, or Firm*—Scott A. McBain

(57) ABSTRACT

A master cylinder assembly including a boost assembly. The hydraulic master cylinder includes a cylinder defining an elongated bore, a piston slidably positioned in said bore, inlet means in the cylinder for admitting hydraulic fluid into the bore from a reservoir, and an outlet fitting in said cylinder communicating with said bore and operative to convey hydraulic fluid out of the bore for delivery to a brake device in response to linear movement of the piston in the bore. The boost assembly includes an electric motor. A hollow ball nut and screw assembly is operably connected to the motor. A screw of the ball nut and screw assembly is positioned to advance the piston in response to actuation of the motor. An input rod extending through the screw includes a first end positioned to receive a brake input force and a second end positioned to advance the piston independently from the screw. The assembly further includes sensing and control means to sense the brake input force and control the motor responsive to the brake input force.

20 Claims, 6 Drawing Sheets

ELECTRIC BRAKE BOOSTER WITH UNRESTRICTED MANUAL PUSH THROUGH

TECHNICAL FIELD

This invention relates to master cylinder assemblies, and more particularly to a master cylinder assembly in which the master cylinder includes a boost feature. The boost feature includes an electric motor actuated feature forming a part of the master cylinder assembly.

BACKGROUND OF THE INVENTION

Master cylinders are in wide use in various industries, but particularly in the motor vehicle industry wherein they serve in conjunction with an associated slave or wheel brake cylinder located at each of the wheels of the vehicle. Each wheel brake cylinder is supplied with pressurized fluid when an operator depressing the brake pedal of the vehicle actuates the master cylinder. Although manual actuation of the master cylinder can be effective to produce the desired resultant action at the associated brake cylinder, often it is desirable to provide power-assist operation of the master cylinder.

Many current brake systems include such a power-assist feature using engine vacuum to boost the operation of the master cylinder. In a system where engine vacuum is not available, such as in an electric-powered vehicle, it would be desirable to provide a brake boost feature that provides similar functionality as that of vacuum or other boost schemes. It would be further advantageous to provide a master cylinder having a non-vacuum boost feature in combination with a manual actuation feature in order to ensure continuous operation of the brake system in the event the boost feature becomes disabled.

SUMMARY OF THE INVENTION

The object of this invention is directed to the provision of an improved master cylinder assembly. More particularly, this invention is directed to the provision of a power operated master cylinder assembly especially suitable for use in a braking system of a motor vehicle.

In one aspect of the invention, the master cylinder assembly comprises a motor having a housing; a hydraulic master cylinder including a housing rigidly connected with a transmission housing, wherein the master cylinder includes a cylinder defining an elongated bore, a piston movable linearly and slidably in the bore, inlet means in the cylinder for admitting hydraulic fluid into the bore from a reservoir and an outlet fitting in the cylinder communicating with the bore and operative to convey hydraulic fluid out of the bore for delivery to a braking device in response to linear movement of the piston in the bore. An input rod is positioned to effect movement of the piston. In addition to the input rod, a hollow ball screw assembly is separately operative in response to actuation of the input rod by a brake pedal to move the piston linearly in the bore. This arrangement provides a simple and compact drive mechanism with a manual push through especially suitable for any situation requiring a power boosted manual brake master cylinder.

Another aspect of the invention provides a master brake cylinder assembly including a hydraulic master cylinder with a piston slidably positioned in a cylinder. A hollow ball screw assembly is positioned to advance the piston in response to actuation of a motor and an input rod extends through the hollow ball screw assembly to apply an input force to the piston independently of the hollow ball screw assembly.

Other aspects of the invention provide a hydraulic master brake cylinder assembly wherein the cylinder defines an elongated bore, inlet means in the cylinder for admitting hydraulic fluid into the bore from a reservoir, and an outlet fitting in said cylinder communicating with said bore and operative to convey hydraulic fluid out of the bore for delivery to a brake device in response to linear movement of the piston in the bore.

Other aspects of the present invention provide an assembly further including sensing and control devices to sense the input force and control the motor responsive to the brake input force. The sensing device can include a differential force sensing assembly positioned adjacent an output end of the input rod. The differential force sensing assembly can include an elastomeric member positioned at the output end of the input rod. The output end of the input rod can include a position sensor associated therewith. The differential force sensing assembly can include at least one magnet associated with an output button, the output button contacting the piston. Compression of the elastomeric member causes relative movement between the position sensor and the magnet.

Other aspects of the present invention provide a transmission to drivingly connect the motor and hollow ball screw assembly. The transmission can include at least two pulleys, one of which is connected to the motor and the other of which is connected to the ball screw assembly, the at least two pulleys being drivingly connected by a belt. The transmission can further include a clutch. The clutch, when activated, couples the transmission to the motor. The clutch, when deactivated, allows the transmission to turn freely. The motor can include a primary motor and a secondary motor. The primary motor and the secondary motor each have a pulley connected thereto, the transmission further comprising an idler pulley positioned between the primary and secondary motor pulleys. The primary motor is a high current/high torque motor for fast response and high load capacity. The secondary motor is a motor requiring lower current and producing lower torque than the primary motor.

Other aspects of the invention provide a position sensor positioned adjacent the idler pulley in the transmission adapted to detect rotation of the idler pulley. The idler pulley can include a shaft extending therefrom, the shaft including at least one magnet, the magnet positioned adjacent the transmission position sensor.

Another aspect of the present invention provides a boost assembly for a hydraulic master cylinder including an electric motor. The motor rotatably drives a ball nut. A hollow screw is positioned within and threadably engaged to the ball nut, the screw having an end positioned to advance a piston of the hydraulic master cylinder when rotation of the motor linearly advances the screw. An input rod extends through the screw, the input rod including an input end positioned to receive a brake input force and an output end positioned to advance the piston responsive to the brake input force. A sensing and control means is provided to sense the brake input force and control the motor responsive to the brake input force.

Another aspect of the present invention provides a method of providing a boost force to a hydraulic master cylinder including compressing a reaction disc. A change in position of the reaction disc based on the extent of compression of the reaction disc is detected. An input force is determined based on the detected change in position and a boost force is applied based on the determined input force.

Other aspects of the present invention provide an application of the boost force that includes activating a boost motor based on the determined input force. The determination of the input force can include comparing the detected change in position to a predetermined change in position and activating the boost motor if the detected change meets or exceeds the predetermined change in position.

Another aspect of the present invention provides a system for providing a boost force to a hydraulic master cylinder including means for compressing a reaction disc, means for detecting a change in position of the reaction disc based on the extent of compression of the reaction disc, means for determining an input force based on the detected change in position and means for applying a boost force responsive to the determined input force.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
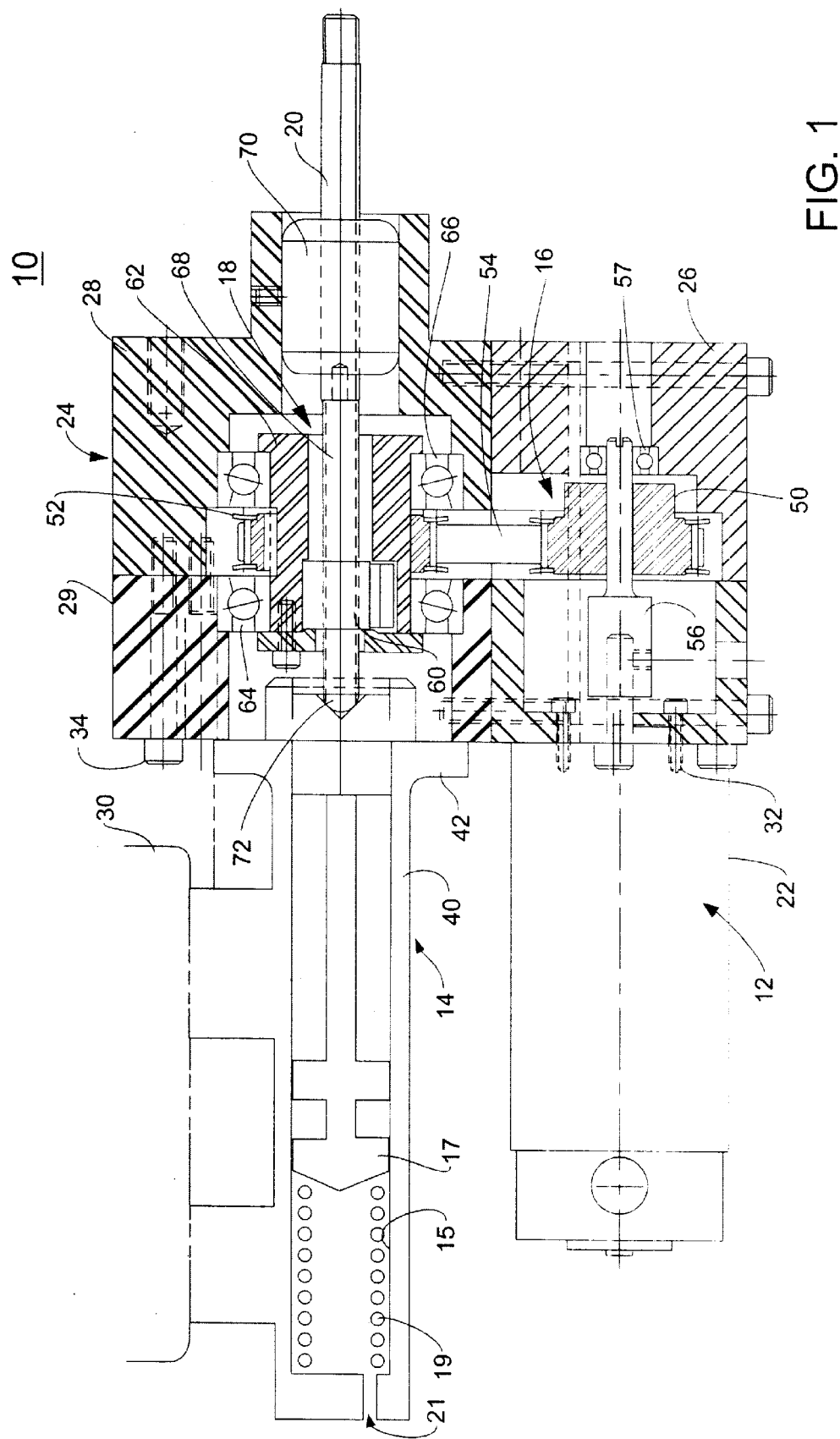
FIG. 1 is a cross-sectional view of a motor vehicle brake control system employing an embodiment of a master cylinder boost assembly of the present invention.

The master cylinder and boost assembly 10 seen in FIG. 1, broadly considered, includes, an electric motor 12 that can be a DC motor, a master cylinder 14 interconnected to the electric motor by a transmission system 16. The master cylinder includes a ball screw 18, which is drivable by the transmission system 16. An input rod 20 generally provides input of driver apply force to the assembly 10. The assembly 10 allows brake input force to be applied to the master cylinder from either operation of the ball screw 18 and linear motion of the input rod 20 or both features in combination.

Motor 12 can be of the direct current permanent magnet design and can include a motor housing 22. The motor 12 can be attached to the assembly 10 by known means or can be positioned within a main body housing 24 of the assembly. A shaft or shaft extension 56 can extend from the motor 12 supported by bearing 57. As shown, the motor 12 can be positioned substantially axially parallel to the master cylinder 14. However, it will be understood that the orientation of the motor 12 is not critical to the operation of the invention. As such, the motor could be oriented according to space requirements, and so on. In addition, it is contemplated that the motor 12 could be positioned concentrically outside the ball screw 18 in a known manner. The ball screw can thus be rotated, for example, by attachment to an armature of the motor, thus eliminating need for a transmission.

Main body housing 24 can be formed of a ferrous or other suitable material by casting or other known methods. In the embodiment shown in FIG. 1, the main body housing 24 is formed of multiple castings. Thus, a first housing portion 26 can be attached to a second and third housing portion 28, 29. The motor housing 22 can be attached to the first housing portion 26 and the ball screw 18 and input rod 20 can be positioned within housing portions 28, 29. The master cylinder 14 generally including a bore 15 and a reservoir 30 (partially shown) can be attached to housing portion 29. Motor housing 22 can be attached to main body housing 24 by any known method including fasteners 32. Similarly, housing 29 can be fastened to the master cylinder 14 by fasteners, one of which is shown at 34 or the like. In the alternate, main body housing 24 can be formed as a single structure or unitary housing.

Master cylinder 14 can generally include a main body member 40, a reservoir 30, a mounting flange 42, a piston 17 and a return spring 19. As is conventional, the spring 19 can provide a return bias to the piston 17. Main body member 40 and flange 42 can be formed as a single integral member. The flange 42 allows attachment of the master cylinder 14 to the main body housing 24. The main body member 40 can be a generally cylindrical member. As is conventional, main body member 40 defines an elongated axial bore 15 or chamber into which the piston 17 is slidably disposed.

The reservoir 30 can be plastic and attached to the body member 40. As is conventional, the reservoir 30 stores and provides brake fluid. The bore 15 of the body member 40 is in fluid communication with the reservoir 30. The piston 17 is slidably received in the bore 15 of main body member 40. Movement (inward advancement) of the piston 17 (in the left direction with respect to FIGS. 1 and 2) within the bore 15 provides brake fluid apply pressure to an associated remote brake assembly as is conventional, through outlet 21.

The transmission system 16 can include a first and second pulley 50, 52. A belt 54 can be wrapped around pulleys 50, 52 to transfer power from the motor 12 to the ball screw 18. The first pulley 50 can be mounted to the motor shaft 56. It will be understood that any suitable mechanism can be used to transfer power from the motor 12, e.g., belts, toothed belts, chain belts or gears and the like. Also, the pulleys can be sprockets or the like, which operate in conjunction with a chain.

The motor 12 can be activated in the advancing or retracting direction during a brake application or retraction or designed to only activate in the advancing direction. In one embodiment, the motor 12 and transmission 16 is idle until boost is needed. The transmission can "freewheel" or is otherwise allowed to freely rotate until the motor is actuated.

The second pulley 52 can be drivingly engaged to a hollow ball screw 18. In particular, rotation of the second pulley 52 causes rotation of the ball nut 60 portion of the ball screw 18. Ball nut 60 can be connected or captured by cylinder 62. Cylinder 62 in connected to pulley 52 and can be supported by a pair of ball bearings 64, 66. In another embodiment, ball bearings 64, 66 can be one or more thrust bearings. Rotation of the pulley 52 rotates cylinder 62 and thus, ball nut 60. Rotation of ball nut 60 causes linear advancement of the screw shaft 68. In this manner, when actuation of the motor 12 causes rotation of the pulleys 50, 52 of the transmission 16, the ball screw 18 converts the rotational motion to linear motion of the screw shaft 68. The ball screw assembly 18 can be "back-drivable". In another embodiment, (FIG. 2) the ball screw assembly can include a hollow ball screw.

An input rod 20, which can be the same element as the screw shaft 68 or a separate element, is positioned to accept input force or brake demand force from the vehicle driver. If the input rod 20 is separate to screw shaft 68 the rod 20 can be connected to the screw shaft 68. The input rod 20 can be splined, or the like, and is prevented from rotation by linear bearing 70 which includes an anti-rotation feature. The input rod 20 can, in the alternate, extend the full length of main body housing 24 through the nut 60 of the ball screw 18 and include grooves to operatively cooperate with the nut 60 of the ball screw 18 similar to the operation of the screw shaft 68.

An output end of the screw shaft 72 can transfer the force provided by either (or both) the vehicle operator depressing a brake pedal and operation of the motor 12 and ball screw 18 to the piston 17. In this manner, the driver apply force and the boost force are additive.

As will be explained more fully below, conventional position and/or pressure sensors can be used to sense an input force, for example, through the input rod 20 and sense the position of the output end of the screw shaft. Also, an amount of rotation of the transmission can be sensed. The values provided by the various sensors are used by a control device (not shown) to determine when and how much boost to apply to the master cylinder assembly.

Figure 2:
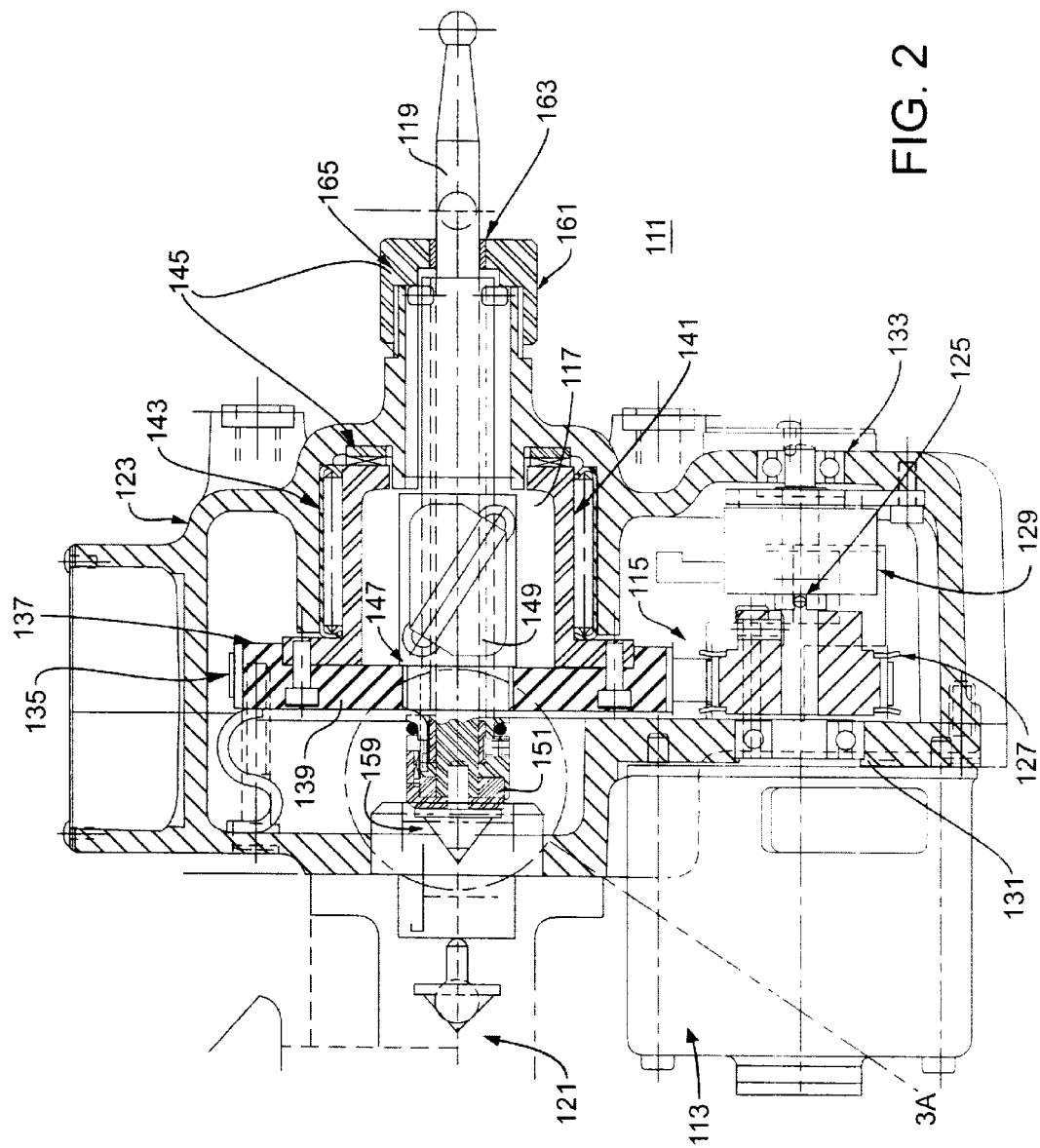
FIG. 2 is a cross-sectional view of another embodiment of the boost assembly of the present invention.

The master cylinder and boost assembly 111 seen in FIG. 2, broadly considered, includes, an electric motor 113 that can be a DC motor connected to a transmission system 115. The transmission 115 drivingly connects the motor 113 to a ball screw assembly 117. An input rod 119 generally provides input of driver apply force to the assembly 111. The assembly 111 allows brake input force to be applied to a piston of a master cylinder (shown in partial phantom at 121) from either operation of the ball screw 117 or linear motion of the input rod 119 or both features additively, in combination.

Motor 113 is attached to housing 123, which can be essentially a one-piece housing. Transmission 115 and ball screw 117 can be positioned within housing 123. Input rod 119 is positioned in housing 123, and can be aligned with the axis of piston of hydraulic cylinder 121. Input rod 119 can extend through ball screw assembly 117 and function as the screw 149 of ball screw assembly 117. Cap 161 including an axial bearing 163 can be attached to housing 123 adjacent the input rod 119 to hold the input rod. Set screw 165 can be provided to prevent rotation of input shaft 119.

In this embodiment, the motor 113 can be positioned below hydraulic cylinder 121 and fastened to the housing 123. Shaft 125 of the motor 113 can extend into the housing 123 to engage transmission 115.

A first pulley 127 of transmission 115 can be mounted upon shaft 125 of motor 113. Shaft 125 can extend to clutch 129. The clutch 129 can be an electromagnetic clutch or any suitable clutch, such as a spring clutch. Shaft 125 can be supported at the motor end and the clutch end by bearings 131, 133. Clutch 129 operates to couple pulley 127 to shaft 125. When clutch 129 is engaged, the shaft 125 is operatively coupled to motor 113. When the clutch is disengaged, the shaft 125 can rotate freely. Belt 135 is wrapped from pulley 127 around second pulley 137. As above, the means by which motor 113 rotates ball screw 117 can be any suitable device, for example pulleys, gears, sprockets and so on.

The second pulley 137 can turn plate 139. Plate 139 is connected to cup member 141. Cup member 141 can be supported by roller bearing 143 and thrust bearing 145. Roller bearing 143 can be positioned between an outer surface of the cup member 141 and an inner surface of the housing 123.

Cup member 141 is connected to ball member 147 of ball screw 117. Rotation of cup member 141 rotates the ball portion 147 of ball screw 117. Rotation of ball 147 urges screw shaft 149 (or input rod 119) in a linear (axial) direction as is known. As discussed, screw shaft 149 can be attached to input rod 119. Screw shaft and input rod can be a single shaft. An output end of the screw shaft 149 can contact a portion of a reaction disc 151. Output end of screw shaft 149, reaction disc 151, and additional associated components are shown in more detail in FIG. 3.

Figure 3B:
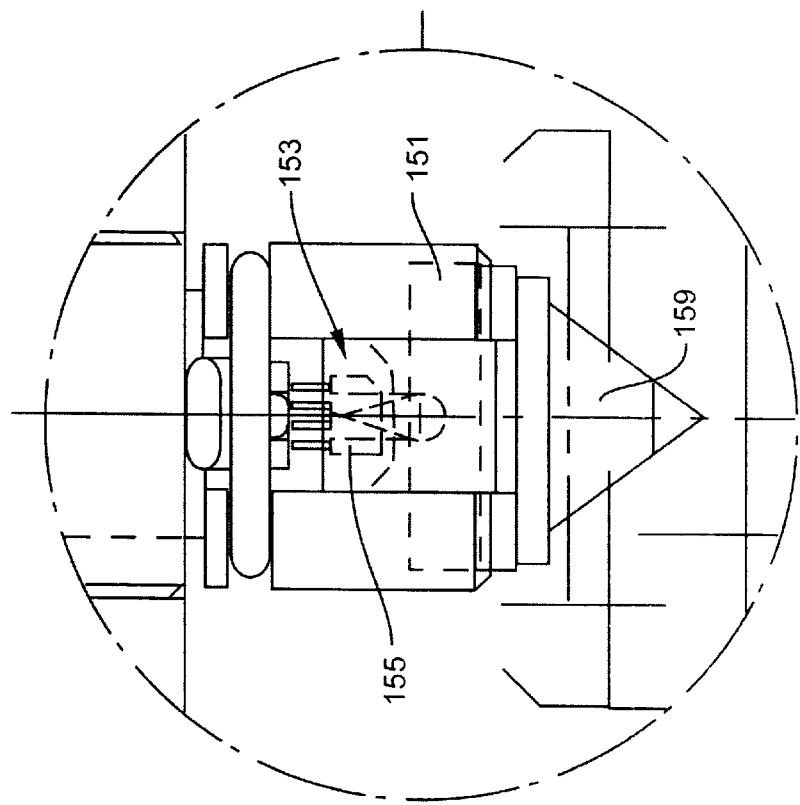
FIG. 3B is a top view of the assembly shown in FIG. 3A partially cut away.
Figure 3A:
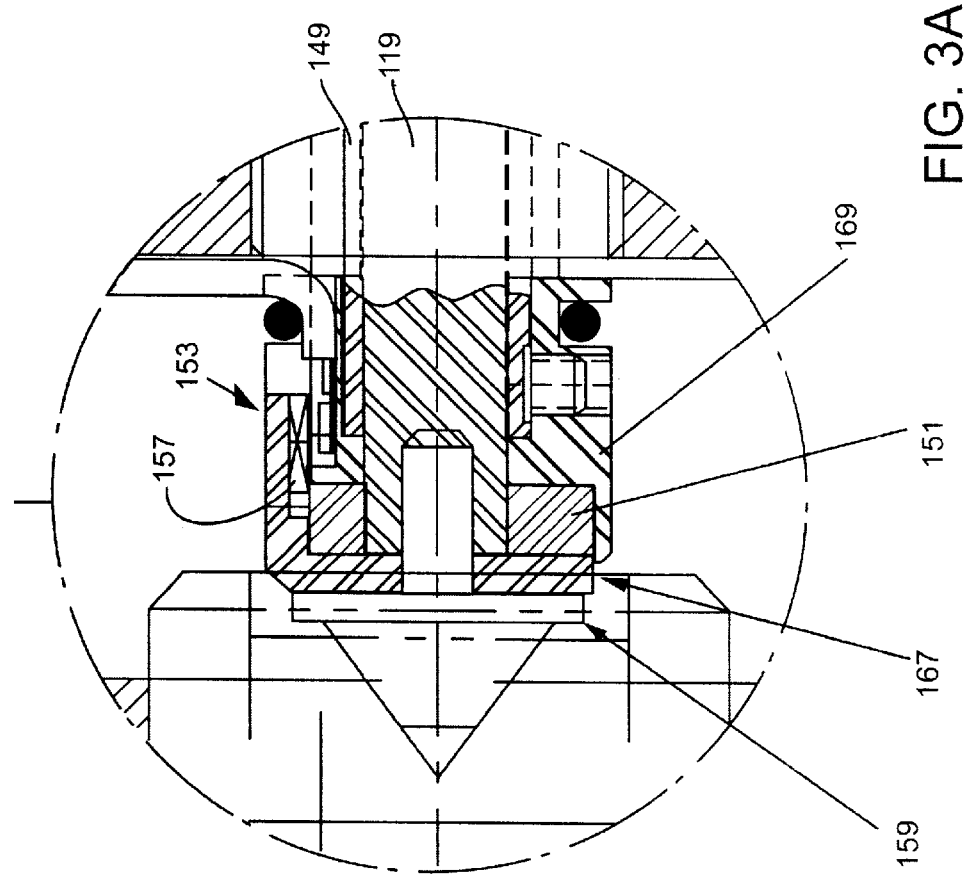
FIG. 3A is a cross-sectional view of a portion of the output and of the ball screw shaft and associated elements.

Referring to FIGS. 2, 3A and 3B, the reaction disc 151 comprises an elastomeric material that allows the disc to compress. Reaction disc 151 is positioned between bracket 167 and bracket 169. A differential force assembly 153 can be positioned adjacent the disc. The differential force assembly 153 can include a position sensor 155, such as a Hall effect sensor, which can be mounted on bracket 169, and at least one magnet 157, which can be mounted on bracket 167. Since bracket 167 is mounted on opposite side of reaction disc 151 with respect to bracket 169, the two brackets move relative to each other when reaction disk 151 is compressed. The assembly 153 can measure the driver input force when the screw shaft 149 compresses the reaction disc 151 during a brake apply. The input force or demand force is a function of a given relative displacement across the disc 151 detected by the assembly 153. In this manner, the driver input force can be determined. After an input force is detected and determined, the boost assembly advances the screw shaft 149 by activating the motor 113 and clutch 129, rotating the transmission 115 and ball screw 117 and further advancing the screw shaft 149. At this time, a further compression of the disc 151 occurs, the effect of which can also be detected by the sensor 155. The difference between the initial compression (from the driver input) and the secondary compression yields the force generated by the boost assembly, i.e., the boost force generated by the motor 113 through the transmission 115 and ball screw 117 advancing the screw shaft 149. In this manner, both the driver input force and boost force can be determined.

Returning to FIG. 2, the reaction disc 151 can contact an output rod button 159 attached to or in positioned in contact with the piston rod (not shown) of the hydraulic cylinder 121. Thus, advancement of the screw shaft 149 (in the left direction of FIG. 2) causes the piston to provide increased fluid pressure within the hydraulic cylinder 121 and thus, impart a brake apply force to slave cylinders or remote brake assemblies connected thereto (not shown).

Figure 4:
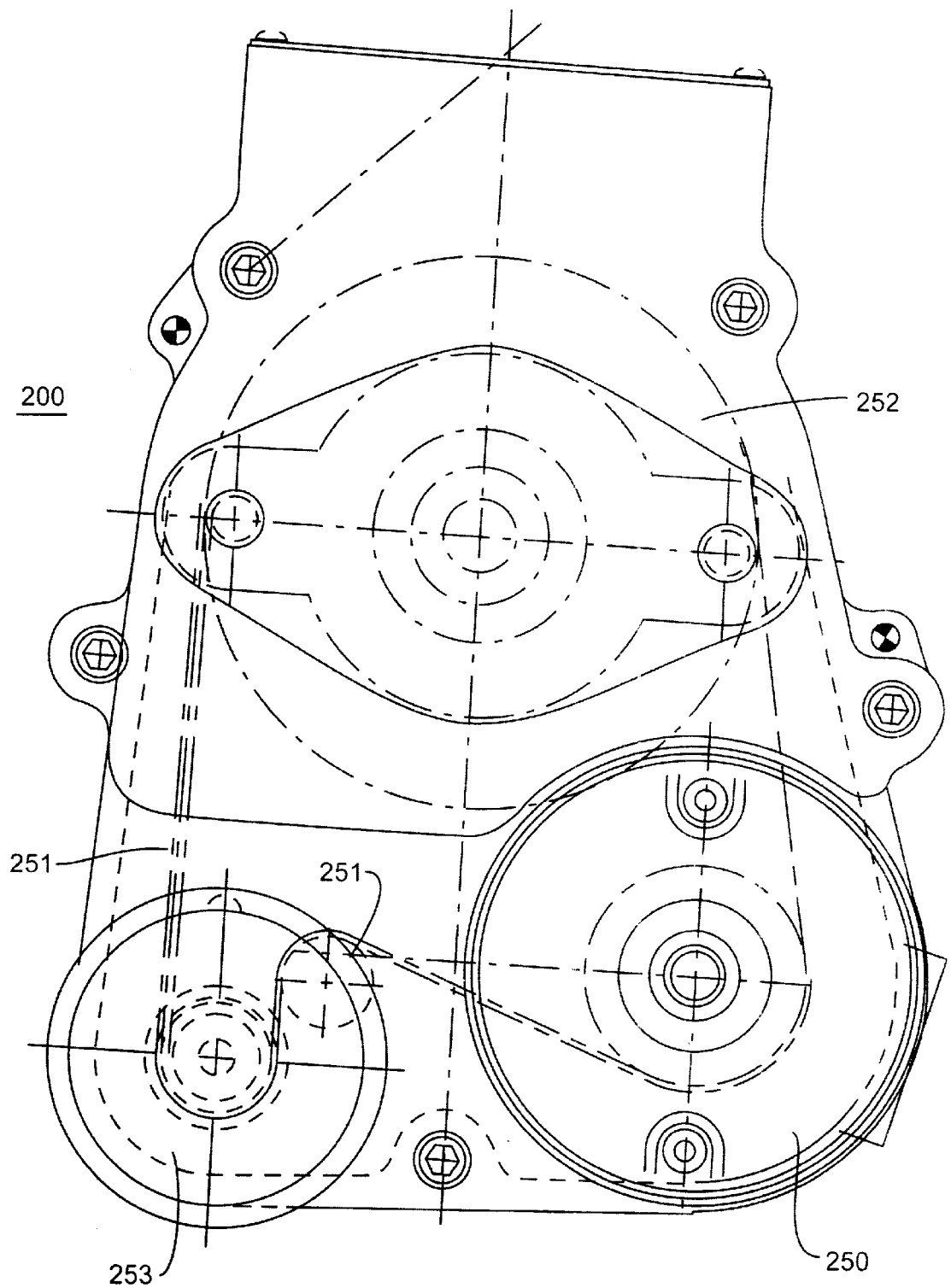
FIG. 4 is an end view of an embodiment of a master cylinder boost assembly power transmission arrangement.
Figure 5:
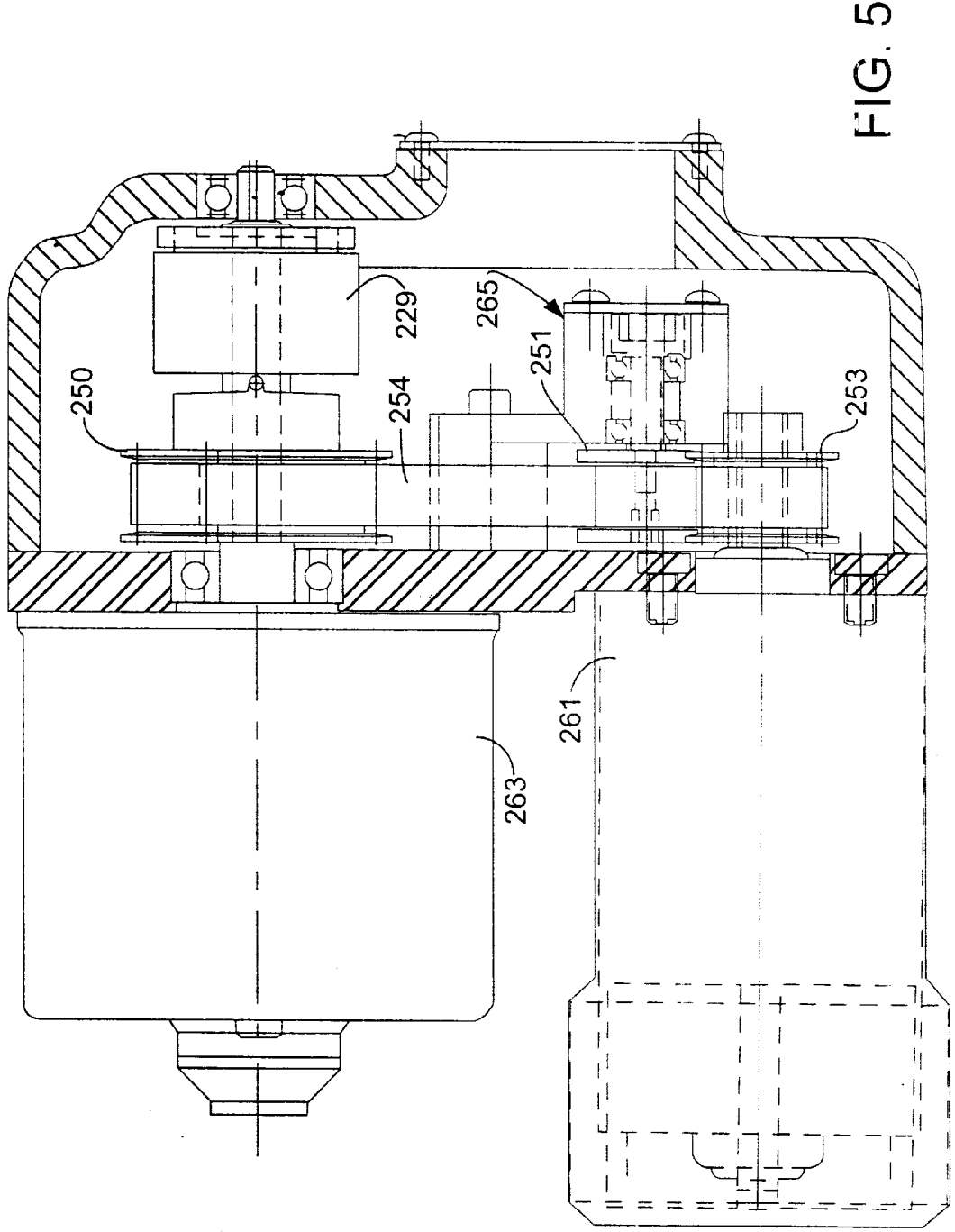
FIG. 5 is a partial cross-sectional view of an embodiment of a portion of a master cylinder boost assembly power transmission shown in FIG. 4.

As shown in FIGS. 4 and 5, the arrangement of the transmission system 200 can include more than two motors, each having different characteristics. In the illustrated example, power transmission belt 254 is wrapped around a first pulley 250 associated with a first electric motor 263. The first electric motor 263 can be a high current/high torque type for fast response. The belt 254 wraps around an idler pulley or gear 251. The idler 251 when provided with a tensioner capability, as is known, can be used to maintain alignment and tension of the belt 254. Further, the idler pulley 251 output can be provided to a rotational sensor 265, which will be illustrated further below.

Idler/tensioner mechanism 251 can be positioned between the first pulley 250 and a second pulley 253 associated with a second motor 261. The second motor 261 can be a low current/high speed type. In this manner, the system 200 is capable of combining a good response time with high load capacity. In addition, the system 200 can produce a mid-range output or holding force using relatively low current. It will also be understood that the respective diameters of the first pulley 250 and the second pulley 253 can be sized according to the operating characteristics of each motor 263, 261. In other words, the pulley ratios are adjusted to match the output of each motor. The belt 254 wraps around pulley 252, which is driveably connected to the ball screw (not shown).

Figure 6:
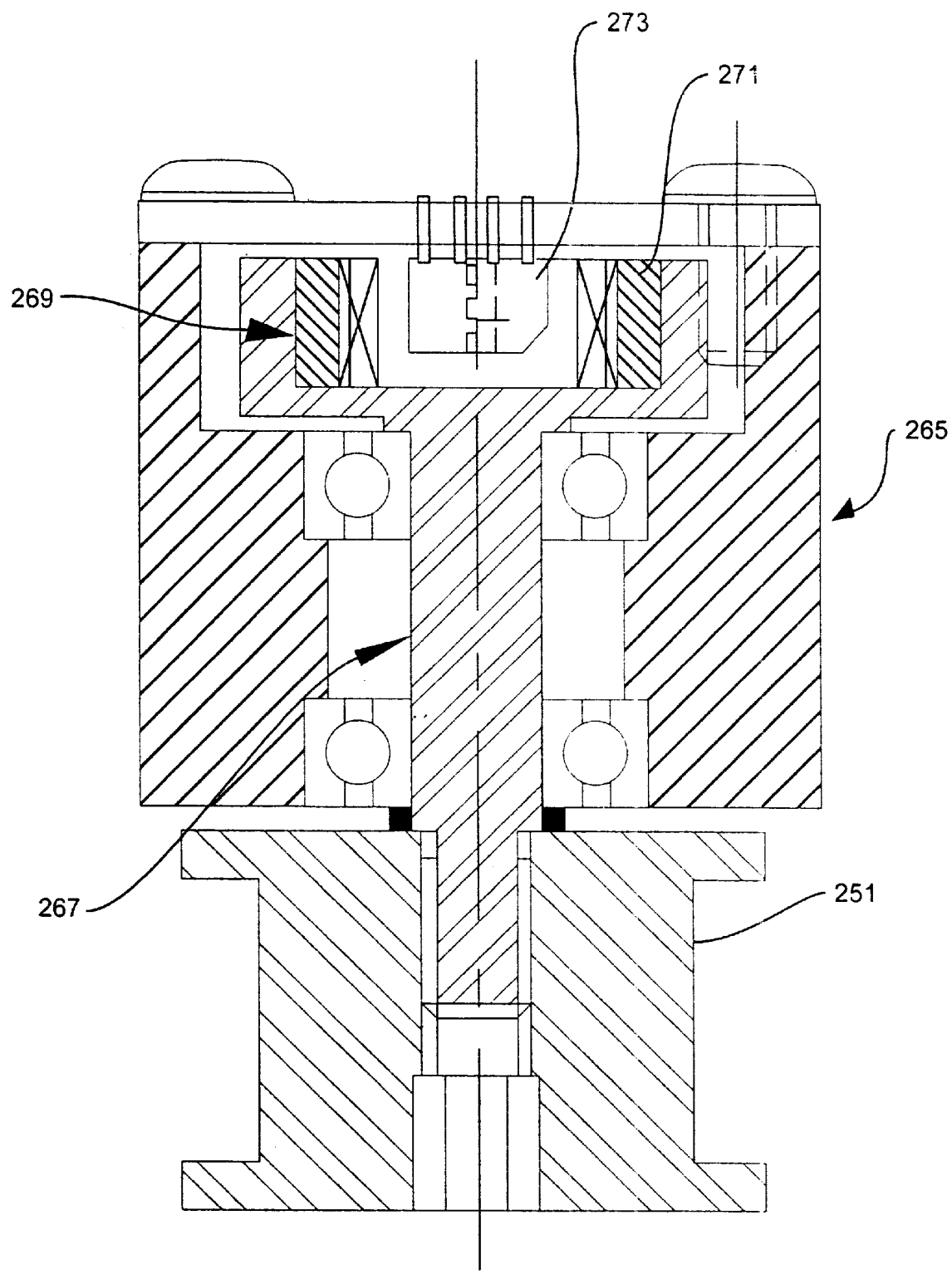
FIG. 6 is a cross-sectional view of an embodiment of a position sensor assembly.

Referring to FIG. 6, rotation sensor assembly 265 is shown in detail. The pulley 251 can include the shaft 267 extending therefrom. The distal end of the shaft 267 can include magnets 269, 271. Magnets 269, 271 can be a pair over a plurality of magnet portions. A position sensor 273 is held adjacent magnets 269, 271. Thus, as pulley 251 is rotated by the transmission, the shaft 267 causes magnets 269, 271 to rotate past position sensor 273. In this manner, the signal can be generated by position sensor 273 that represents advancement of the transmission.

Referring again to FIGS. 3A and 3B, in operation, the vehicle operator, through an associated pedal, applies a brake force to the input rod 119. At some point in the assembly, for example, between the brake pedal and the output button 159 an input force can be sensed. The force sensor used to determine the input force can be located at any suitable location. However, locating the sensor between the ball screw assembly 117 and the output button 159 is preferred.

The signal obtained from the sensor 153 can be used to determine whether a boost is required and the magnitude of boost required. When the control system (not shown) determines that a boost is required an appropriate electrical signal is sent to the motor 113 and clutch 129. When electricity is provided in known manner to the motor 113, the transmission 115 is caused to rotate with the result that ball screw 117 produces linear advancement of the output shaft 149. For example, to move piston to the left as viewed in FIG. 1 in a direction to discharge pressure fluid from outlet fitting, motor 113 is energized in a sense to rotate the transmission 115 in a direction to advance ball screw shaft 149 to the left as seen in FIG. 2.

Conversely, when it is desired to allow piston to be retracted, the electrical current or signal to motor 113 and clutch 129 is discontinued. A position sensor assembly 153 can continuously sense the linear position of the ball screw shaft 149. For example, the sensor assembly 153 can include a Hall Effect proximity (position) sensor 155 positioned adjacent the output button 159 with an associated permanent magnet 157. It will be understood that Hall Effect sensor 155 can detect the passage of magnet 157, which can be a plurality of magnets or magnetic portions, as the ball screw 147 advances shaft 149 and transmits a signal thereby to a suitable counter device (not shown) or the like, so that the linear position of the ball screw shaft 149 and the master cylinder piston are precisely known at all times by the instantaneous reading of the counter device.

In this manner, during a brake command operation of the assembly, the screw shaft 149 of the ball screw 117 is caused to contact the reaction disc 151 and output rod button 159 with the effect of advancing the piston into the bore of the hydraulic cylinder and producing a hydraulic apply force to an associated brake cylinder in a brake assembly. When the apply force is reduced or removed, the screw shaft 149 can retract so as to reduce or remove the hydraulic apply force.

It will be understood that the ball screw shaft 149 can advance the piston in the master cylinder 121 by either application of a force applied to the shaft 149 by the vehicle operator alone or in combination with a force produced by actuation of the motor/transmission/ballscrew assembly and thus, produce a hydraulic apply force. In this manner, if a brake command fails to produce a boost operation of the boost assembly, the operator of the vehicle can still produce sufficient advancement of the piston through the input rod 119 to bring the vehicle safely to a halt.

Advantages of the system or assembly as described herein include the offering of a low-cost and low power-consuming booster for vehicles without the benefit of a vacuum supply. The booster assembly can emulate all aspects of the booster function. Unlike some other brake-by-wire systems the present booster assembly allows continuously variable pedal feel/feedback. Further, the present booster assembly takes up less space than conventional vacuum boosters.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A master brake cylinder assembly comprising:
   a hydraulic master cylinder including a piston slidably positioned in a cylinder;
   a hollow ball screw assembly positioned to advance the piston in response to actuation of a motor;
   an input rod extending through the hollow ball screw assembly to apply an input force to the piston independently of the hollow ball screw assembly; and
   sensing and control means to sense the input force and control the motor responsive to the brake input force,
   wherein the sensing means includes a differential force sensing assembly positioned adjacent an output end of the input rod.

2. The assembly of claim 1 wherein the differential force sensing assembly includes an elastomeric member positioned at the output end of the input rod.

3. The assembly of claim 2 wherein the output end of the input rod has a position sensor associated therewith.

4. The assembly of claim 3 wherein the differential force sensing assembly includes at least one magnet associated with an output button, the output button contacting the piston.

5. The assembly of claim 4 wherein compression of the elastomeric member causes relative movement between the position sensor and the magnet.

6. The assembly of claim 4 wherein the motor includes a primary motor and a secondary motor.

7. A master brake cylinder assembly comprising:
   a hydraulic master cylinder including a piston slidably positioned in a cylinder;
   a hollow ball screw assembly positioned to advance the piston in response to actuation of a motor; and
   an input rod extending through the hollow ball screw assembly to apply an input force to the piston independently of the hollow ball screw assembly,
   wherein the motor and hollow ball screw assembly are drivingly connected by a transmission; and
   wherein the transmission includes at least two pulleys, one of which is connected to the motor and the other of which is connected to the ball screw assembly, the at least two pulleys being drivingly connected by a belt.

8. The assembly of claim 7 further comprising:
a clutch.

9. The assembly of claim 8 wherein the clutch, when activated, couples the transmission to the motor.

10. The assembly of claim 8 wherein the clutch, when deactivated, allows the transmission to turn freely.

11. A master brake cylinder assembly comprising:
a hydraulic master cylinder including a piston slidably positioned in a cylinder;
a hollow ball screw assembly positioned to advance the piston in response to actuation of a motor; and
an input rod extending through the hollow ball screw assembly to apply an input force to the piston independently of the hollow ball screw assembly,
wherein the motor and hollow ball screw assembly are drivingly connected by a transmission;
wherein the motor includes a primary motor and a secondary motor, and
wherein the primary motor and the secondary motor each have a pulley connected thereto, the transmission further comprising an idler pulley positioned between the primary and secondary motor pulleys.

12. The assembly of claim 11 wherein the primary motor is a high current/high torque motor for fast response and high load capacity.

13. The assembly of claim 12 wherein the secondary motor is a motor requiring lower current and producing lower torque than the primary motor.

14. The assembly of claim 11 wherein the transmission has a position sensor positioned adjacent the idler pulley adapted to detect rotation of the idler pulley.

15. The assembly of claim 14 wherein the idler pulley includes a shaft extending therefrom, the shaft including at least one magnet, the magnet positioned adjacent the transmission position sensor.

16. A boost assembly for a hydraulic master cylinder comprising:
an electric motor;
a ball nut rotatably driven by the motor;
a hollow screw positioned within and threadably engaged to the ball nut, the screw having an end positioned to advance a piston of the hydraulic master cylinder when rotation of the motor linearly advances the screw;
an input rod extending through the screw, the input rod including an input end positioned to receive a brake input force and an output end positioned to advance the piston responsive to the brake input force; and
sensing and control means to sense the brake input force and control the motor based on the brake input force,
wherein the sensing means includes a differential force sensing assembly positioned adjacent an output end of the input rod.

17. A method of providing a boost force to a hydraulic master cylinder comprising:
compressing a reaction disc;
detecting a change in position of the reaction disc based on the extent of compression of the reaction disc;
determining an input force based on the detected change in position; and
applying a boost force based on the determined input force.

18. The method of claim 17 wherein the application of the boost force comprises activating a boost motor based on the determined input force.

19. The method of claim 18 wherein determining the input force comprises comparing the detected change in position to a predetermined change in position and activating the boost motor if the detected change meets or exceeds the predetermined change in position.

20. A system for providing a boost force to a hydraulic master cylinder comprising:
means for compressing a reaction disc;
means for detecting a change in position of the reaction disc based on the extent of compression of the reaction disc;
means for determining an input force based in the detected change in position; and
means for applying a boost force responsive to the determined input force.

* * * * *